United States Patent [19]

Finn

[11] Patent Number: 5,607,309
[45] Date of Patent: Mar. 4, 1997

[54] INSTRUCTIONAL METHOD AND APPARATUS FOR TEACHING DATA COLLECTION AND ANALYSIS

[75] Inventor: Lynda M. Finn, Madison, Wis.

[73] Assignee: Joiner Associates, Inc., Madison, Wis.

[21] Appl. No.: 229,235

[22] Filed: Apr. 18, 1994

[51] Int. Cl.$^6$ ................................................. G09B 25/00
[52] U.S. Cl. ................................ 434/107; 273/292
[58] Field of Search ................................. 434/205, 208, 434/172, 209, 171, 176, 107; 273/272

[56] References Cited

U.S. PATENT DOCUMENTS

| | | | |
|---|---|---|---|
| Re. 25,031 | 8/1962 | Hoolim . | |
| 723,425 | 3/1903 | Thompson | 434/171 |
| 1,598,525 | 8/1926 | Holt | 434/172 |
| 1,682,686 | 8/1928 | Rutherford | 434/172 |
| 2,937,874 | 5/1960 | Ellison | 434/205 |
| 3,653,667 | 4/1972 | Primoff . | |
| 3,892,409 | 7/1975 | Herbert, Jr. | 273/272 |
| 3,959,893 | 6/1976 | Sigg | 434/208 |
| 4,132,015 | 1/1979 | Machen . | |
| 4,236,720 | 12/1980 | Belony | 273/292 |
| 4,332,567 | 6/1982 | Nogues . | |
| 4,419,081 | 12/1983 | Steinmann | 434/208 |
| 5,100,150 | 3/1992 | Larman | 273/272 |
| 5,314,190 | 5/1994 | Lyons | 273/272 |
| 5,337,501 | 8/1994 | Amanze | 273/272 |
| 5,338,203 | 8/1994 | Rheams | 273/272 |

OTHER PUBLICATIONS

"Transparent Visual–Aids" Physics Research Laboratories, Inc. Promotional Material (Hempstead, NY).

Primary Examiner—Paul J. Hirsch
Attorney, Agent, or Firm—DeWitt Ross & Stevens SC

[57] ABSTRACT

An instructional method and apparatus for teaching data collection and analysis is described. The instructional apparatus includes at least one set of planar tile members wherein each planar tile member contains varying forms of collectable data. The instructional method involves collecting and recording the collectable data, translating the collectable data to show patterns in the data, and interpreting the data patterns.

27 Claims, 14 Drawing Sheets

RED SQUARE

BLUE SQUARE

YELLOW SQUARE

RED TRIANGLE

BLUE TRIANGLE

YELLOW TRIANGLE

RED HEX

BLUE HEX

YELLOW HEX

| DEFECT TYPES | TRIANGLES | | | SQUARES | | | HEXAGONS | | | TOTAL |
|---|---|---|---|---|---|---|---|---|---|---|
| | RED | YELLOW | BLUE | RED | YELLOW | BLUE | RED | YELLOW | BLUE | |
| ✵ | 1 | 1 | 1 | 1 | 0 | 1 | 1 | 1 | 1 | 7 |
| ◁ | 3 | 3 | 3 | 3 | 2 | 2 | 2 | 1 | 3 | 22 |
| ◎ | 0 | 10 | 0 | 0 | 9 | 1 | 1 | 11 | 0 | 32 |
| ∽ | 1 | 0 | 0 | 0 | 1 | 1 | 1 | 0 | 1 | 5 |
| ▷ | 1 | 0 | 0 | 0 | 0 | 0 | 1 | 1 | 0 | 3 |
| ✻ | 1 | 0 | 0 | 0 | 0 | 1 | 0 | 0 | 1 | 2 |
| ✺ | 0 | 1 | 1 | 1 | 0 | 1 | 1 | 1 | 0 | 5 |
| OTHER | 0 | 0 | 1 | 1 | 0 | 1 | 1 | 0 | 0 | 4 |

*FIG. 6*

*Blue Data Tiles*

Red Data Tiles

Yellow Data Tiles

FIG. 12

| SERIAL # | SIZE | TIME | COLOR | | |
|---|---|---|---|---|---|
| | | | RED | YELLOW | BLUE |
| 201 | | | | | |
| 202 | | | | | |
| 203 | | | | | |
| 204 | | | | | |
| 205 | | | | | |
| 206 | | | | | |
| 207 | | | | | |
| 208 | | | | | |
| 209 | | | | | |
| 210 | | | | | |
| 211 | | | | | |
| 212 | | | | | |
| 213 | | | | | |
| 214 | | | | | |
| 215 | | | | | |
| 216 | | | | | |
| 217 | | | | | |
| 218 | | | | | |
| 218 | | | | | |
| 219 | | | | | |
| 220 | | | | | |
| 221 | | | | | |
| 222 | | | | | |
| 223 | | | | | |
| 224 | | | | | |
| 225 | | | | | |
| 226 | | | | | |
| 227 | | | | | |
| 228 | | | | | |
| 229 | | | | | |
| 230 | | | | | |
| 231 | | | | | |
| 232 | | | | | |
| 233 | | | | | |
| 234 | | | | | |
| 235 | | | | | |
| 236 | | | | | |

INSTRUCTIONAL METHOD AND APPARATUS FOR TEACHING DATA COLLECTION AND ANALYSIS

FIELD OF THE INVENTION

The present invention relates generally to an instructional method and apparatus which uses physical objects and exercises to teach data collection and analysis. More particularly, the present invention relates to an instructional method and apparatus which uses planar tile members (hereafter referred to as "tiles"), and exercises which employ the tiles, to simulate the output from a production or administrative process in order to provide the opportunity to practice collecting and analyzing data.

DESCRIPTION OF THE PRIOR ART

The prior art in the field of the invention does not appear to disclose any method or apparatus which is similar to the instructional method and apparatus of the present invention for teaching data collection and analysis. The closest prior art appears to reside in the area of games and apparatus for teaching mathematics and logic.

U.S. Pat. No. 3,653,667 to Primoff describes a game apparatus for familiarizing a user with computer flow chart formation. The game apparatus includes three sets of game pieces and a random selection die. One set of game pieces contains a plurality of scoring pieces each containing a quantitative indicia, the second set of game pieces contains a plurality of directional pieces each containing a single directional indicia, and the third set of game pieces contains a plurality of decision pieces each containing plural indicia. The random selection die comprises faces wherein each face contains one of the indicia contained on the decision pieces. The game pieces comprise planar squares which are assembled together in a flow chart configuration. A score is then computed by advancing a scoring piece over the flow chart. The resulting score is dependent upon the user's skill in arranging the flow chart and the function of the random selection die. Although a user of the Primoff game apparatus likely undertakes some mental processes involving data collection and analysis in organizing the flow chart in an attempt to achieve a high score, the apparatus does not teach an ordered method for collecting and analyzing data which can be learned and transferred to a production or administrative business environment.

U.S. Pat. No. 4,132,015 to Machen discloses a teaching-learning apparatus for mathematical systems and basic computer concepts. The teaching-learning apparatus comprises a planar board member having horizontal and vertical columns containing numbers. An attachable baseboard and attachable number markers are also included for covering up portions of the board.

U.S. Pat. No. 4,332,567 to Nogues also discloses a mathematical teaching apparatus. The Nogues apparatus is used to teach arithmetic, metric and analytical geometry, and algebra. The apparatus comprises a cubic block array formed from a plurality of various sized blocks which are arranged in a plurality of planar arrays increasing in height.

U.S. Pat. No. 4,565,373 to Unger discloses a numerical guessing game comprising a set of tiles wherein each tile contains numerical indicia numbered consecutively, a set of feedback tiles wherein each feedback tile contains numerical indicia numbered consecutively, a set of total number tiles wherein each number tile contains numerical indicia numbered consecutively, a visual characteristic which identifies the three tile sets from one another (such as shape), and a playing board. A programmer is chosen from a group of individuals playing the game and the object of the game is to use the tiles, a player's arithmetic skills, and clues provided from the programmer to determine a given set of numbers. Although Unger discloses the use of tiles comprising numbers to conduct a game of logic, no stepped method for teaching data collection and analysis is described.

The previously described numerical and mathematical games each require a user or player to perform a mental analysis in order to play the respective games. However, none of the foregoing games provide a player with a method for using information or data contained within tiles to form descriptive statistics relating to the data. Further, none of the existing prior art provides a method for teaching data collection and analysis which can be learned and then adapted to solve a player's real life business or work-related problems.

SUMMARY OF THE INVENTION

It is a principal object of the present invention to provide an instructional method and apparatus for data collection and data analysis.

It is a further object of the present invention to provide a method and apparatus for teaching data collection and analysis which employs physical objects containing indicia to simulate data output, such as defects or product quality measurements, from a production or administrative process.

It is still a further object of the present invention to provide instructional methods for teaching data collection and analysis which can be adapted to a user's workplace or place of business to identify and solve work or business related defects or problems.

The instructional apparatus for data collection and data analysis includes a plurality of sets of planar tile members wherein each set of tiles comprises a plurality of tiles with each tile having at least one identifying characteristic. Each planar tile member comprises a first upper planar surface, a second lower planar surface, and a plurality of sides which define the shape of the planar tile member. In addition, each set of planar tile members further comprises tiles of varying colors and at least one indicia contained in an upper planar surface of at least one tile member contained within the set. Alternatively, any other physical objects which contain indicia, such as three dimensional objects, globs, spheres, etc. may be used in place of the planar tile members.

The apparatus may further include means for recording the indicia contained within a tile as well as the tile's color and shape, and means for identifying the regularity or pattern of the defects. The means for recording the indicia may comprise a data collection chart while the means for identifying the regularity or pattern of the indicia may comprise a Pareto chart, a frequency plot, a time plot, a control chart, or a scatter plot.

The method for teaching data collection and data analysis in accordance with the present invention includes the steps of generating a set of data tiles, examining the data tiles, collecting and recording the data from the data tiles, translating the recorded data to show a data pattern, interpreting the data pattern, and applying the data to real life situations in order to define defects or problems and ways to change the defects or problems.

The inventive instructional method and apparatus for teaching data analysis and data collection provides a stepped method for learning how to analyze a particular set of data output. This stepped approach is advantageous to companies and individuals in that it provides a physical hands-on opportunity to simulate the acquisition and analysis of data from real life situations. The instructional method and apparatus is adapted to a workplace or business by mentally substituting output from a production or administrative process in place of the tiles in order to define and solve work or business related defects and problems.

The objects and advantages of the invention will appear more fully from the following more detailed description of the drawings in conjunction with the accompanying drawings.

BRIEF DESCRIPTION OF THE DRAWINGS

FIG. 6 is an example of a first data collection chart which may be used in accordance with the instructional method and apparatus of the present invention along with sample recorded data.

FIG. 12 is an example of a third data collection chart which may be used in accordance with the instructional method and apparatus of the present invention.

DETAILED DESCRIPTION OF THE INVENTION

The present invention provides an instructional method and apparatus for teaching data collection and analysis. Although the present invention may be adapted to a plurality of sets of tiles (from one set to several sets), the present invention will be described with respect to the use of two sets of tiles. The instructional apparatus of the present invention includes at least one set of tiles which includes a plurality of tiles containing collectable data, means for collecting and recording the collectable data from the tile, and means for analyzing the collectable data by translating the data to show a data pattern.

Figure 1A:
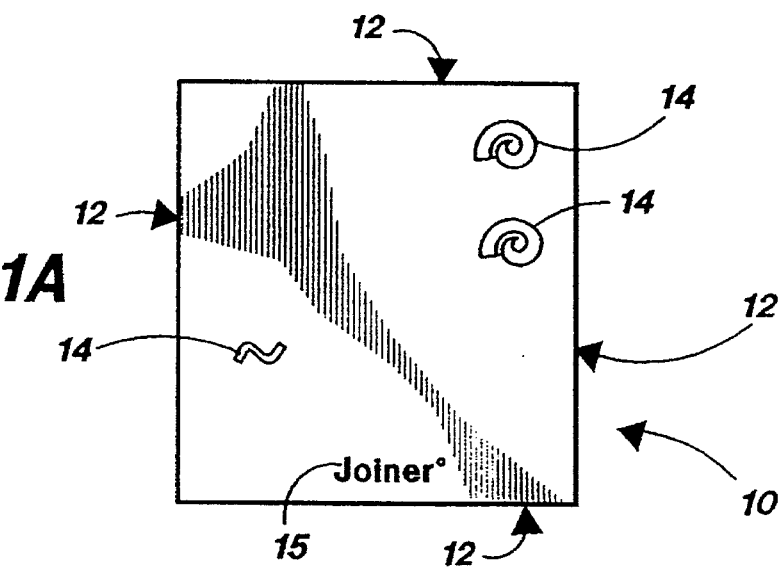
FIG. 1 is a top elevational view of one planar tile member from each of three groups of planar tile members which comprise a first set of planar tile members in accordance with the instructional method and apparatus of the present invention.
Figure 1B:
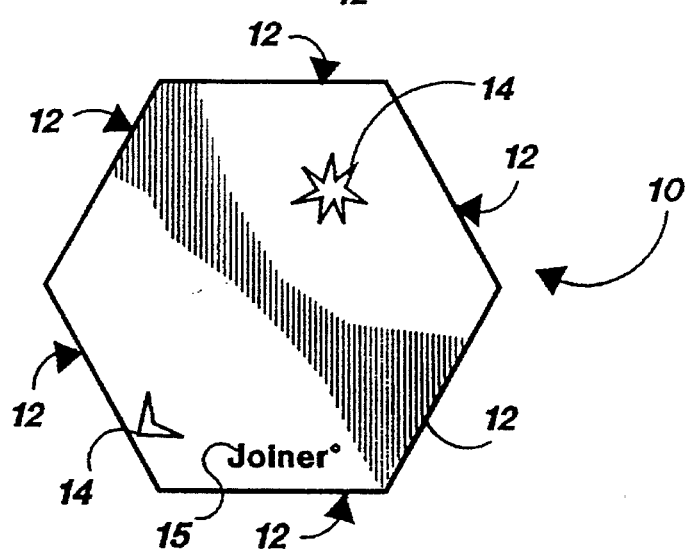
Figure 1C:
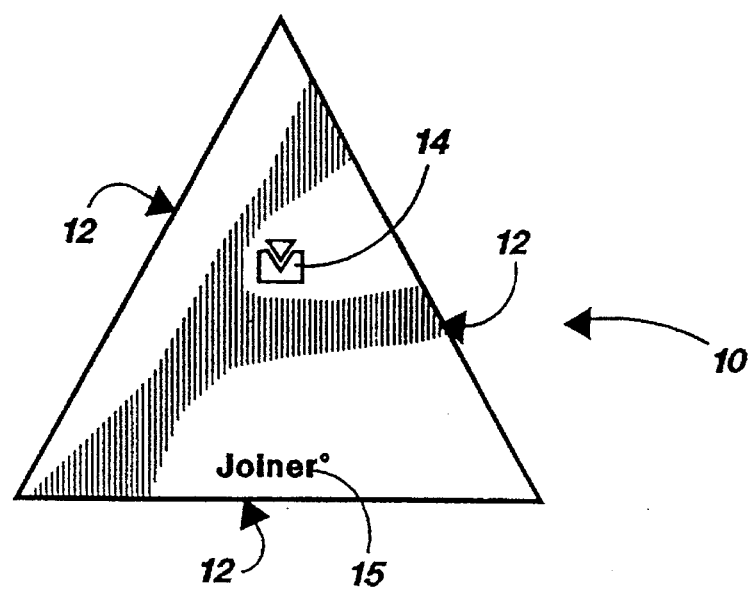
Figure 3A:
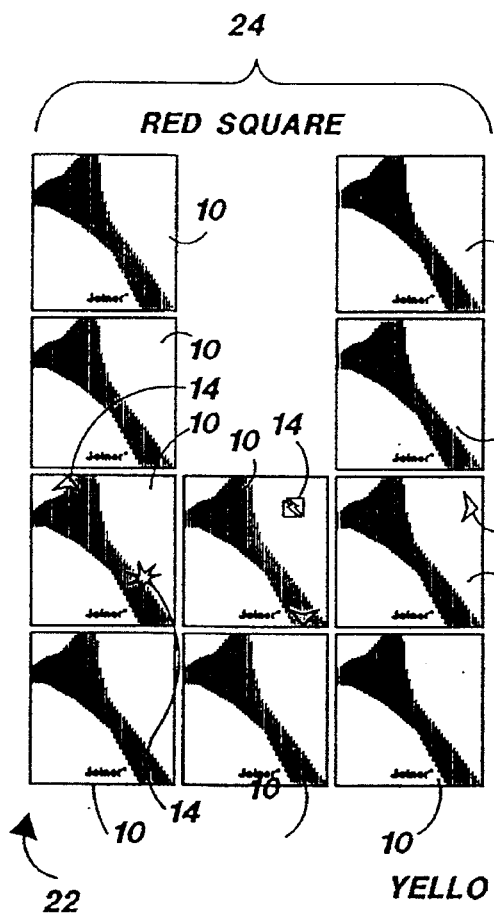
FIG. 3 is a top elevational view of a first group of planar tile members which are included in the first set of planar tile members in accordance with the instructional method and apparatus of the present invention.
Figure 3B:
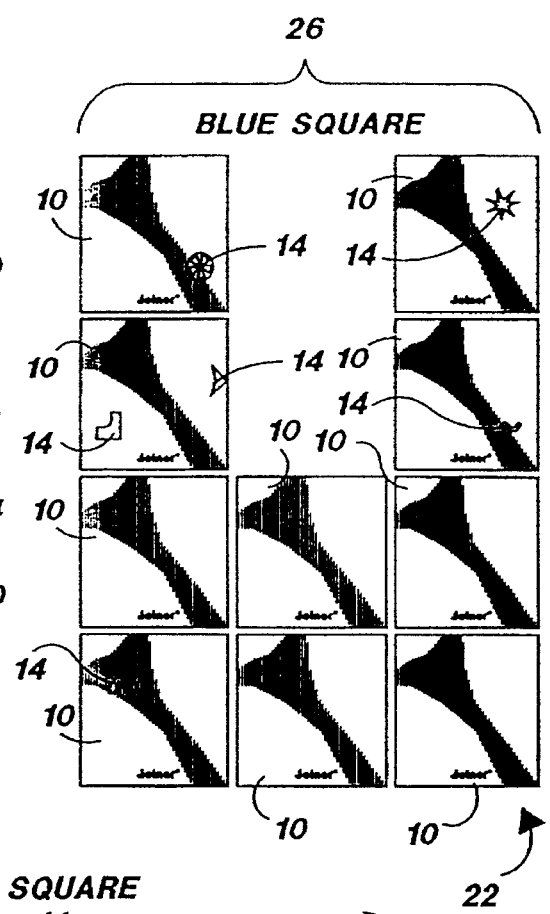
Figure 3C:
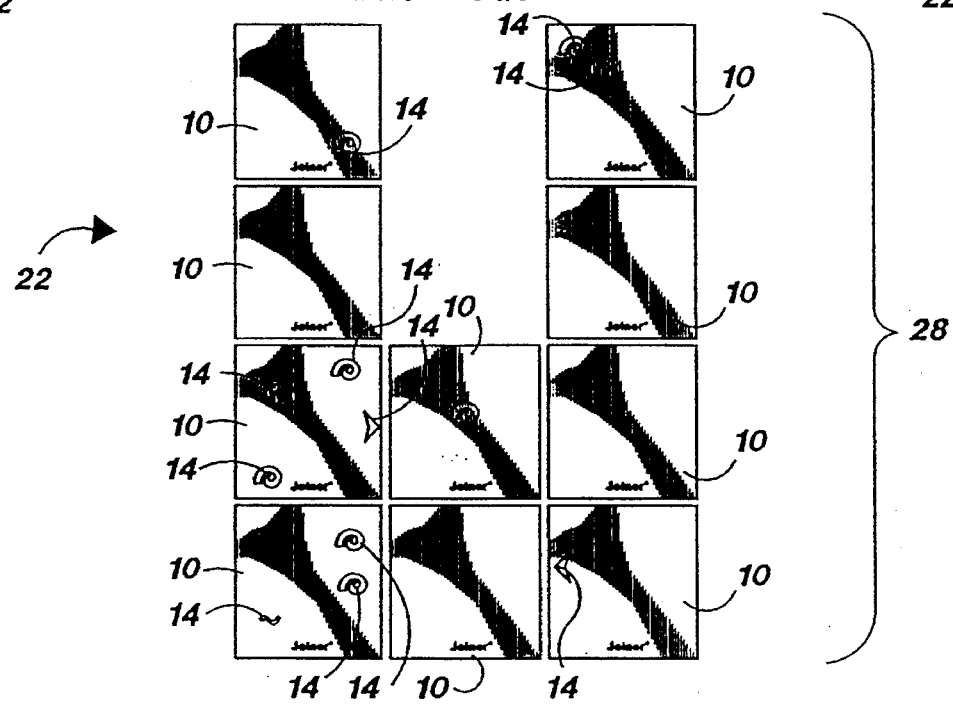
Figure 4A:
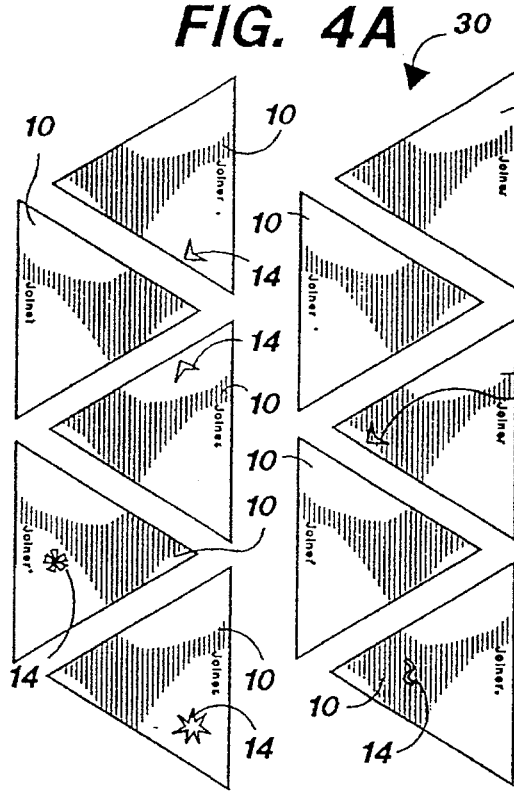
FIG. 4 is a top elevational view of a second group of planar tile members which are included in the first set of planar tile members in accordance with the instructional method and apparatus of the present invention.
Figure 4B:
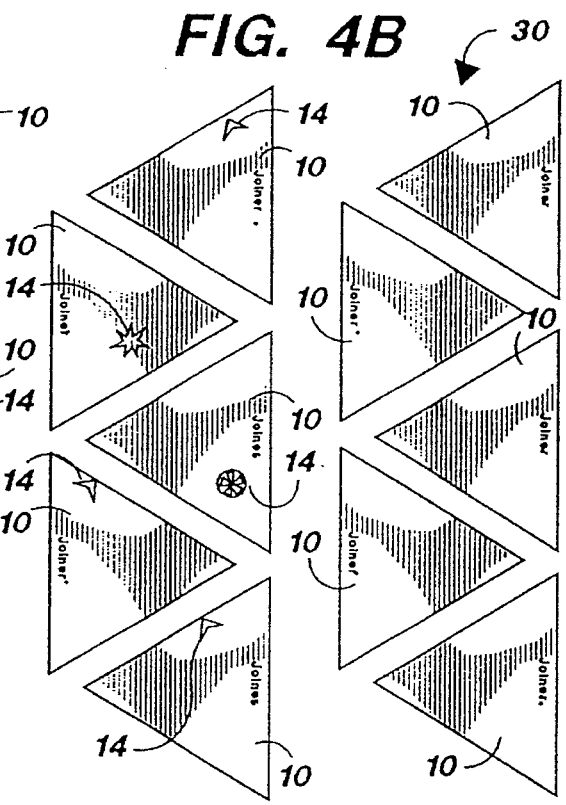
Figure 4C:
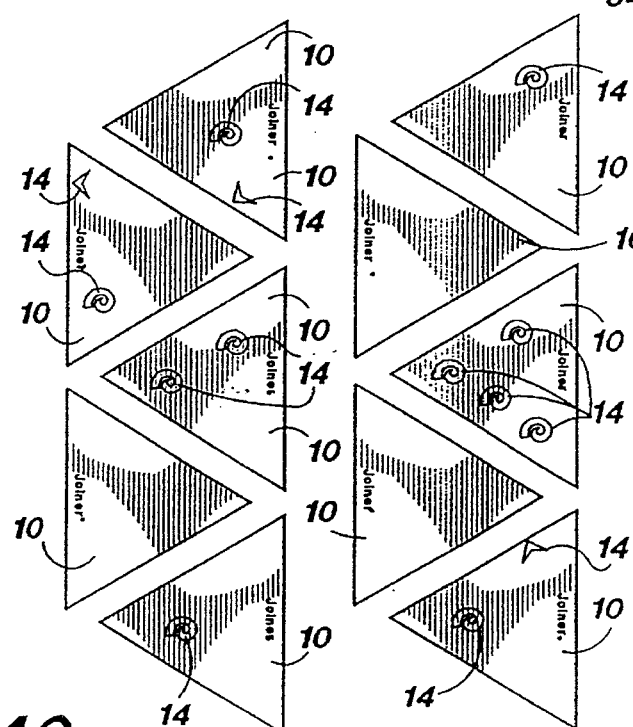
Figure 5A:
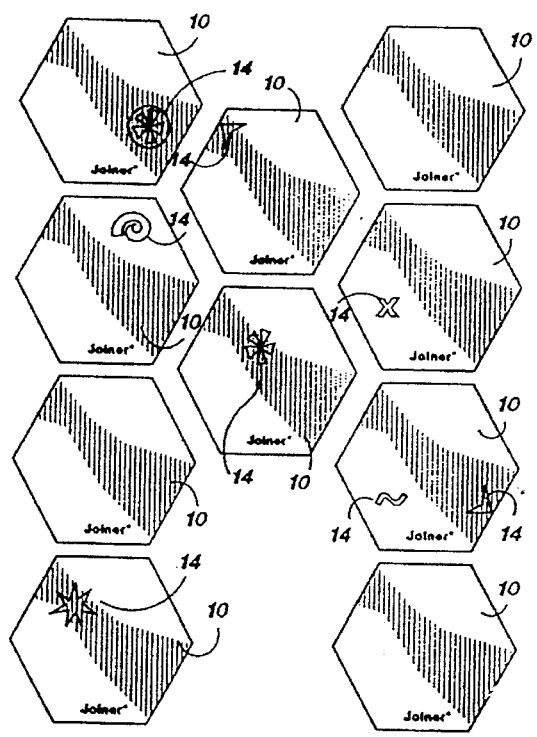
FIG. 5 is a top elevational view of a third group of planar tile members which are included in the first set of planar tile members in accordance with the instructional method and apparatus of the present invention.
Figure 5B:
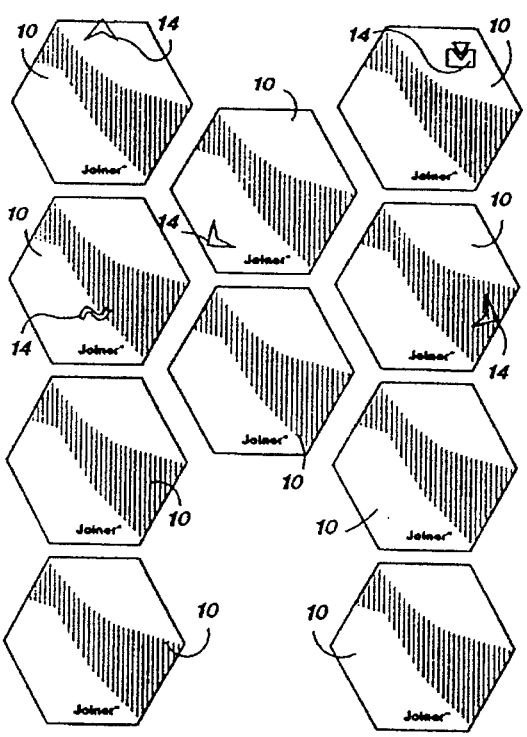
Figure 5C:
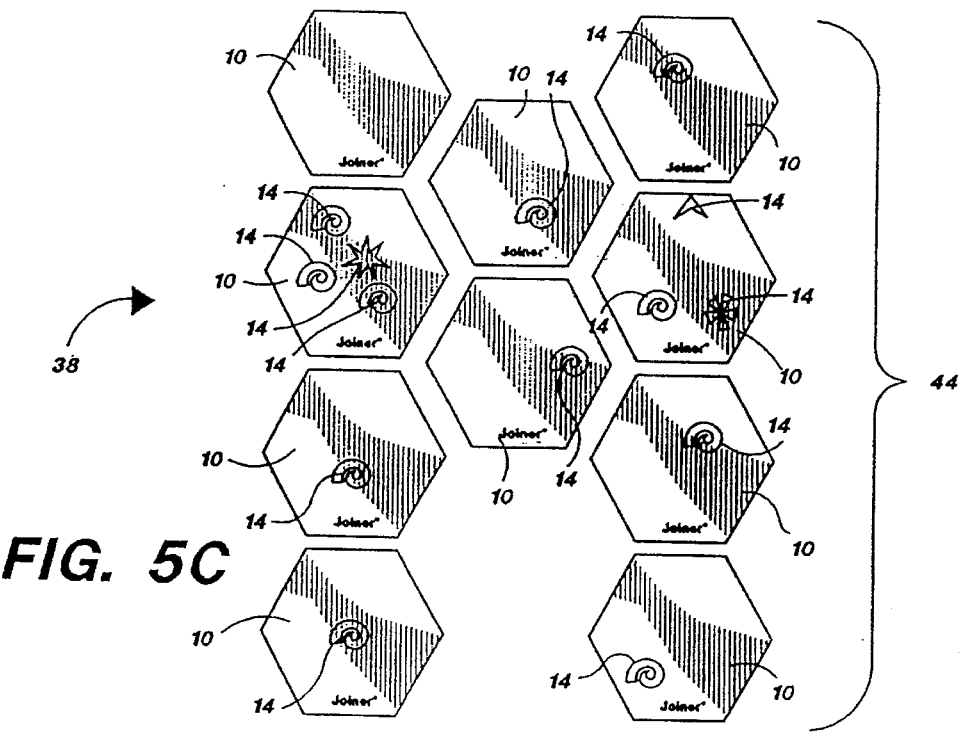
Figure 5C:
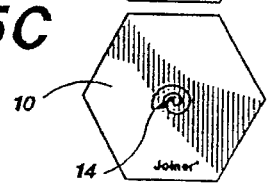

Referring now to the figures, FIG. 1 shows a top planar view of a tile 10 from each of three groups of tiles contained within a first set of tiles 11 (See FIGS. 3–5). Each tile 10 comprises edges 12 which define a particular shape. Each tile 10 may also comprise one or more indicia 14 which are each in the form of a distinct design. The purpose of the defined shapes and the indicia 14 are to provide forms of collectable data for use in the inventive instructional method for teaching data collection and analysis.

Each tile 10 shown in FIG. 1 also comprises an orientation mark 15. For purposes of illustration, the name "Joiner" located near one edge 12 of the tile 10 is the orientation mark 15. "Joiner" is a registered trademark of Joiner Associates, Inc. (Madison, Wis.). The orientation mark 15 is placed near one edge 12 of each tile 10 to provide an orientation for the indicia 14 which are contained in some of the tiles 10. When a user positions the orientation mark 15 so that it is in a readable position like the normal text contained in writings, the mark 15 will always be contained at a bottom of the defined shape which comprises the tile 10. The positioning of the mark 15 then allows a user access to additional collectable data with respect to the indicia 14 contained on the tile 10. For example, once the mark 15 is properly aligned for reading, a user can categorize the indicia 14 as being nearer a top or bottom of the tile 10.

Figure 2A:
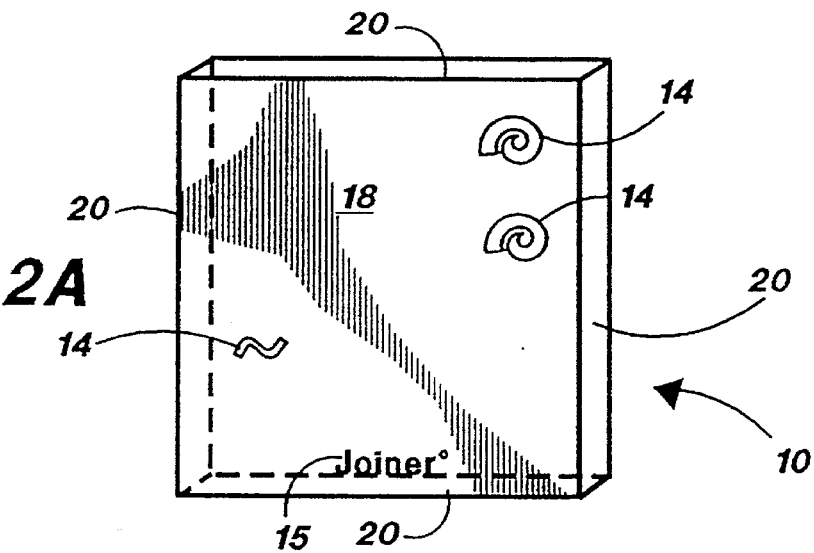
FIG. 2 is a perspective view of one planar tile member from each of three groups of planar tile members which comprise the first set of planar tile members in accordance with the instructional method and apparatus of the present invention.
Figure 2B:
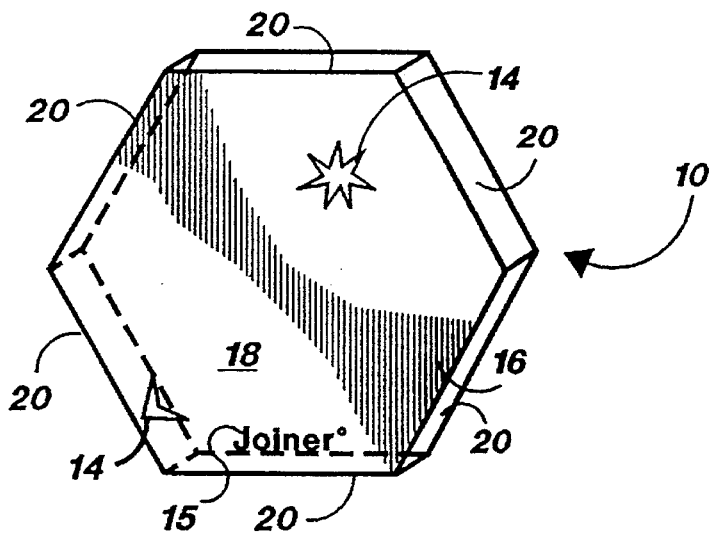
Figure 2C:
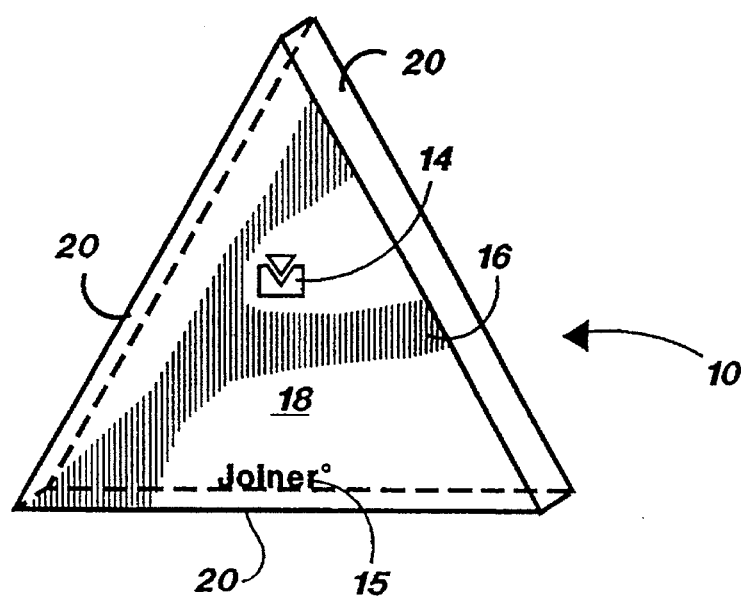

Turning now to FIG. 2, there is shown a perspective view of each of the tiles 10 which were illustrated in FIG. 1. Each tile 10 comprises a first upper planar surface 16, a second lower planar surface 18 and a plurality of side walls 20 which define the shape of the tile 10. The indicia 14 and the orientation mark 15 (the trademark "Joiner") are etched, cut, or stamped into the first upper planar surface 16 of the tile 10. Alternatively, the indicia 14 may be cut into both the first upper planar surface 16 and the second lower planar surface 18 to form a hole through the tile 10. The tiles 10 are preferably translucent to enable an instructor to project the tiles via an overhead projector when utilizing the inventive instructional method.

FIGS. 3–5 illustrate a top elevational view of the three groups of tiles 10 contained in the first set of tiles 11 which comprise part of the inventive instructional apparatus. FIG. 3 shows a first group of tiles 22 comprising a plurality of tiles 10 which each form a defined shape, namely a square. Each of the tiles 10 contained in the first group of tiles 22 further comprise one of three predetermined colors. The first group of tiles contains equal numbers of the various colored tiles 10. For example, in the first group of tiles 22, there are tiles 10 comprising ten red square tiles 24, ten blue square tiles 26, and ten yellow square tiles 28. Some of the tiles 10 in the first group 22 contain indicia 14.

A second group of tiles 30 which are contained within the first set of tiles 11 is shown in FIG. 4. The second group of tiles 30 comprises a plurality of tiles 10 which each form a defined shape in the form of a triangle. Like the first group of tiles 22, the second group of tiles 30 comprises three pre-determined colors of tiles 10. The second group of tiles 30 includes ten red triangular tiles 32, ten blue triangular tiles 34, and ten yellow triangular tiles 36, with some of the tiles 10 containing indicia 14.

FIG. 4 shows a third group of tiles 38 contained within the first set of tiles 11 which comprises a plurality of tiles 10 which each form the shape of a hexagon. The third group of tiles 38 comprises ten red hexagonal tiles 40, ten blue hexagonal tiles 42, and ten yellow hexagonal tiles 44. Some of the tiles 10 contained in the third group 38 also include indicia 14.

The three groups of tiles 22,30,38 which comprise the first set of tiles 11 may contain different numbers of tiles for different instructional exercises. In addition, the tiles may comprise different shapes and colors from those described above with reference to the drawings. Furthermore, the indicia 14 may comprise different symbols, shapes, numbers, or other distinguishing means.

In addition to the first set of tiles 11 which contains three groups of tiles 22,30,38, the instructional apparatus for teaching data collection and analysis also includes a means for recording the collectable data such that a selected type of collectable data may be compared with the remaining types of collectable data from the first set of tiles 11. FIG. 6 illustrates a means for collecting the recordable data contained in the first set of data tiles 11. FIG. 6 shows a first data collection chart 46 which is particularly suitable for developing a Pareto chart. As described later, different data collection forms will be used for developing different types of data patterns when performing different types of data analyses.

With reference to FIG. 6, a selected type of collectable data 48, namely the indicia 14 contained on the tiles 10, is listed in a vertical column on the left hand side of the first data collection chart 46. The remaining types of collectable data 50, namely the colors and shapes of the tiles 10, are arranged in a subset configuration in a horizontal fashion across the top of the first data collection chart 46.

To carry out the inventive structural method using the inventive structural apparatus, a user or groups of users are given the first set of data tiles 11. Next, the user or users identify the types of collectable data associated with the tiles 10 and select one type of collectable data for comparison to the remaining types of collectable data.

Once the users of the inventive method and apparatus have determined that the indicia 14 occur in both the various colors and shapes of the tiles 10, the collectable data (indicia, color, and shape) can be collected and compared by recording the collectable data on the first data collection chart 46. After the collectable data has been recorded into the first data collection chart 46, users can ascertain specific types of information concerning the defects, which are represented by indicia 14, such as: 1) the type of defect that occurs most often, and 2) where the defects seemed to occur most often.

Figure 7:
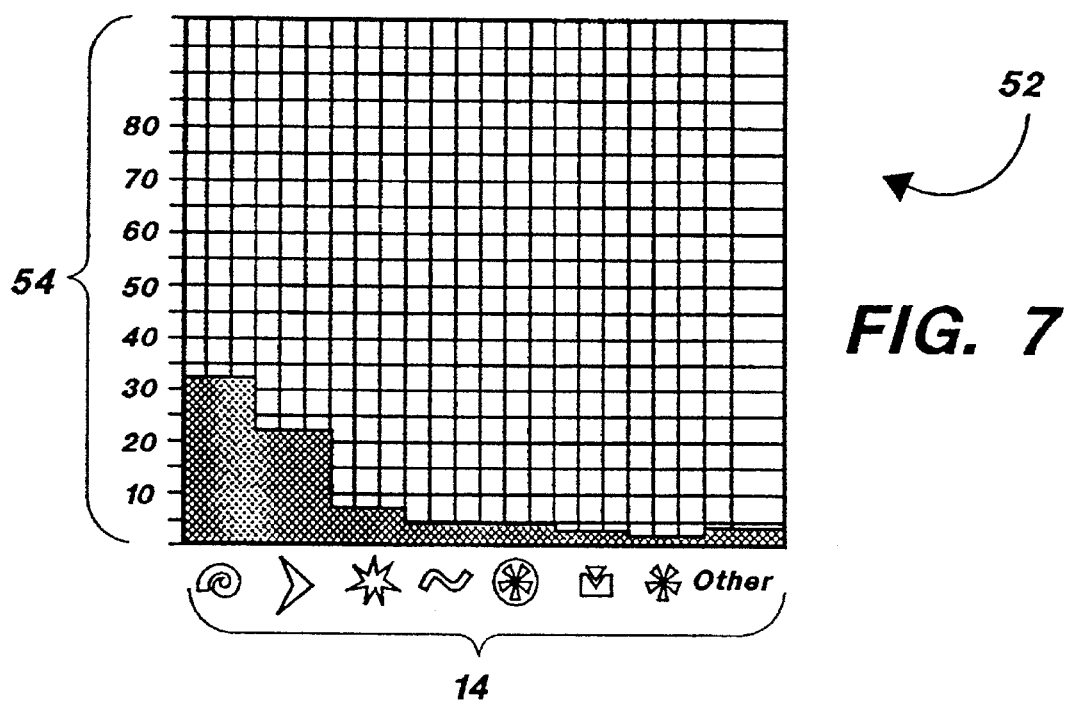
FIG. 7 is an example of a Pareto chart which may be utilized in accordance with the instructional method and apparatus of the present invention along with sample plotted data.

Following the recording of the data, the users can take data from the first data collection form 46, e.g., totals, and produce a Pareto chart. FIG. 7 shows an example of a Pareto chart 52 which shows the total number 54 of the distinct types of indicia 14. Other numbers from the first data collection chart 46 may also be employed in developing Pareto charts. For example, the total number of distinct defects contained in yellow tiles may be charted.

Figure 8:
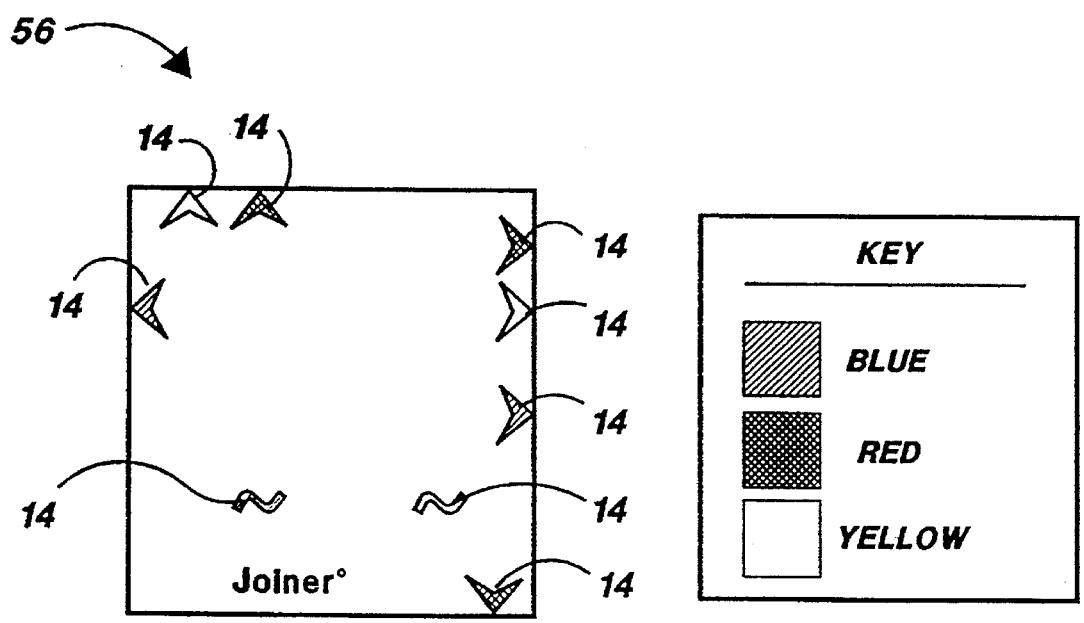
FIG. 8 is an example of a second data collection form, namely a concentration diagram, which may be used in accordance with the present invention along with sample recorded data.

FIG. 8 illustrates an example of a second data collection form 56 which shows the location of the indicia 14 on the first group of tiles 22 contained within the first set of tiles 11. The second data collection form 56 functions as a concentration diagram. Additional concentration diagrams may be produced for the second and third groups of tiles 30,38 contained within the first set of tiles 11.

Figure 9:
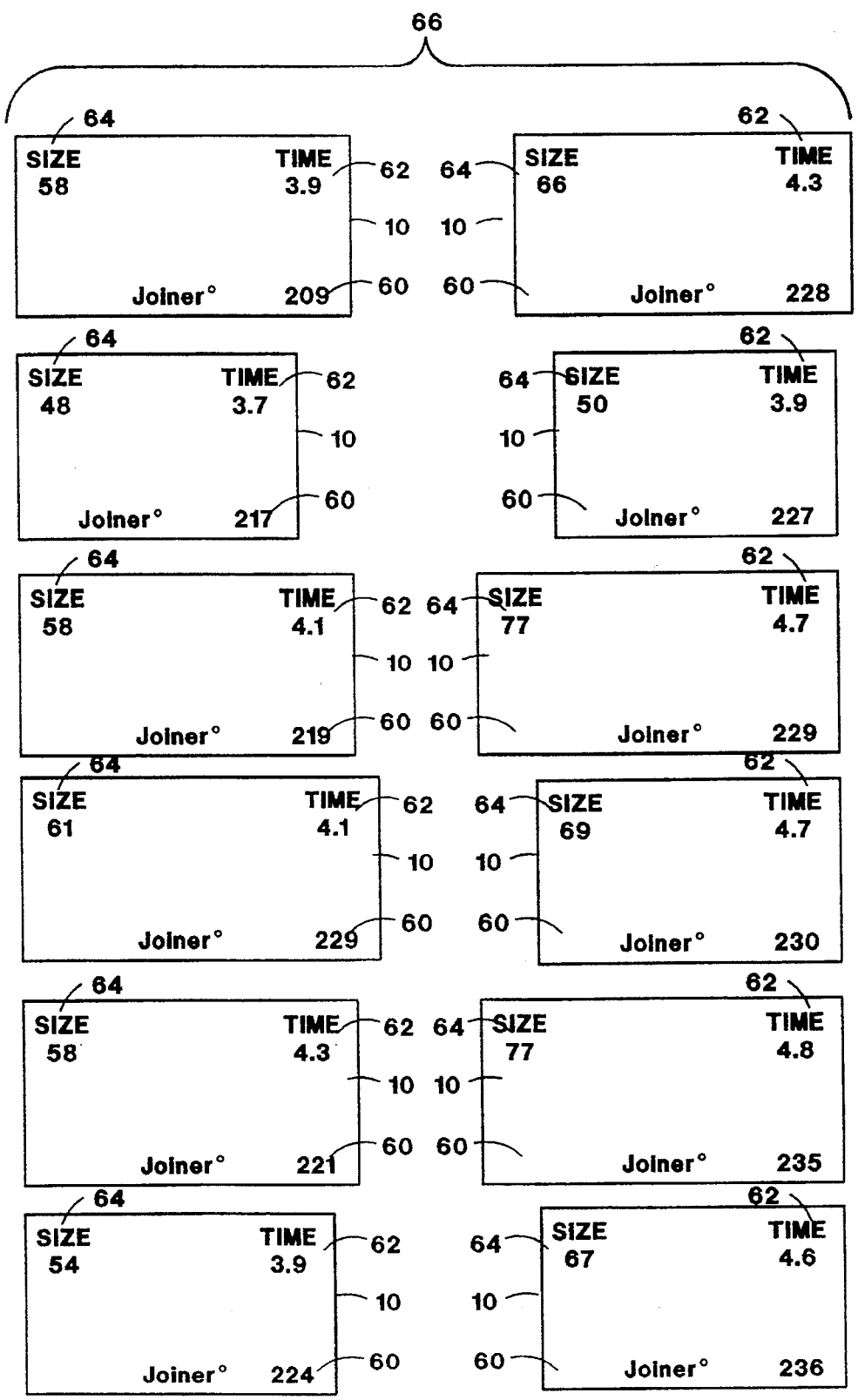
FIG. 9 is a top elevational view of a first group of planar tile members which are included in a second set of planar tile members in accordance with the instructional method and apparatus of the present invention.
Figure 10:
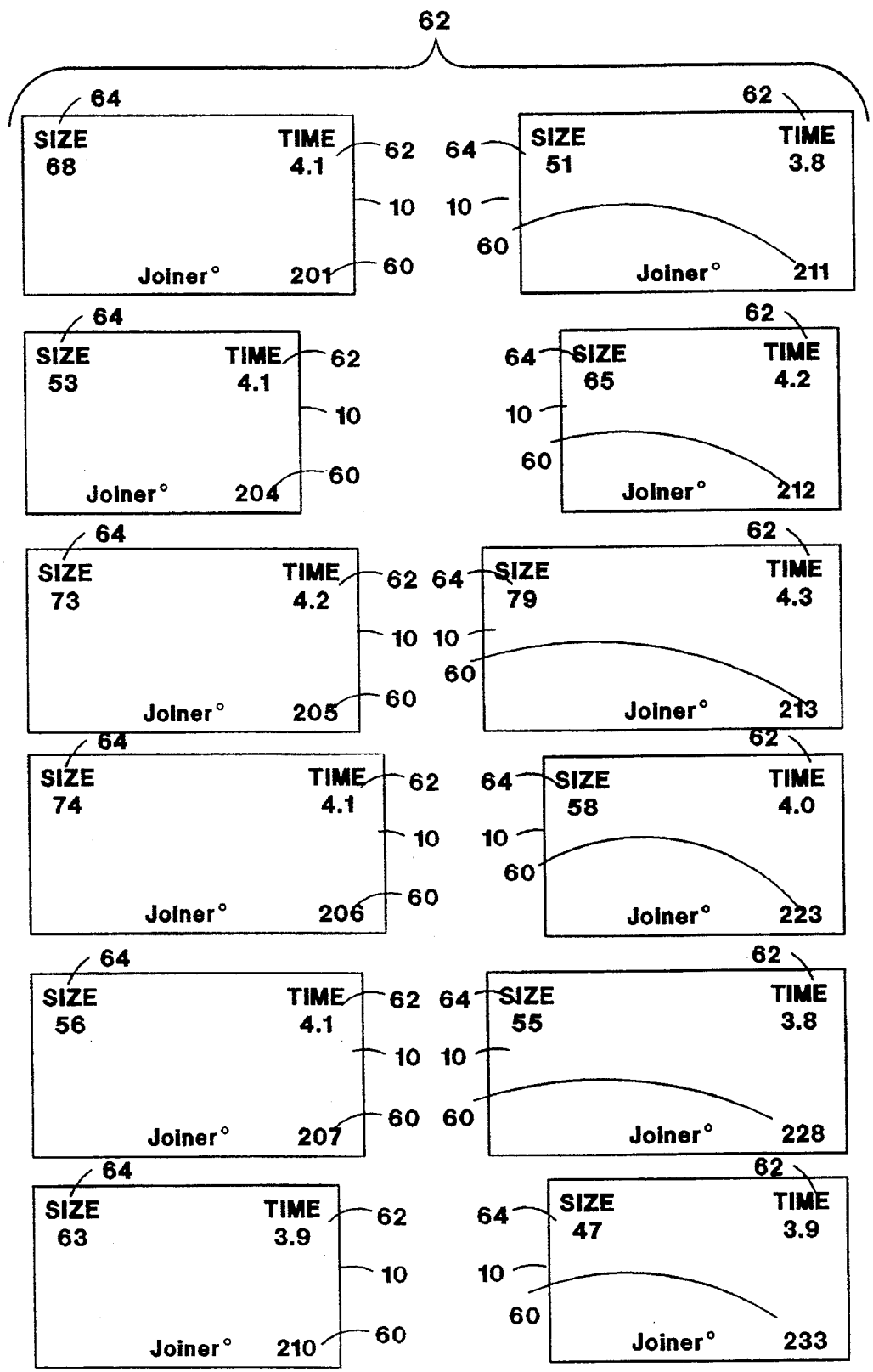
FIG. 10 is a top elevational view of a second group of planar tile members which are included in the second set of planar tile members in accordance with the instructional method and apparatus of the present invention.
Figure 11:
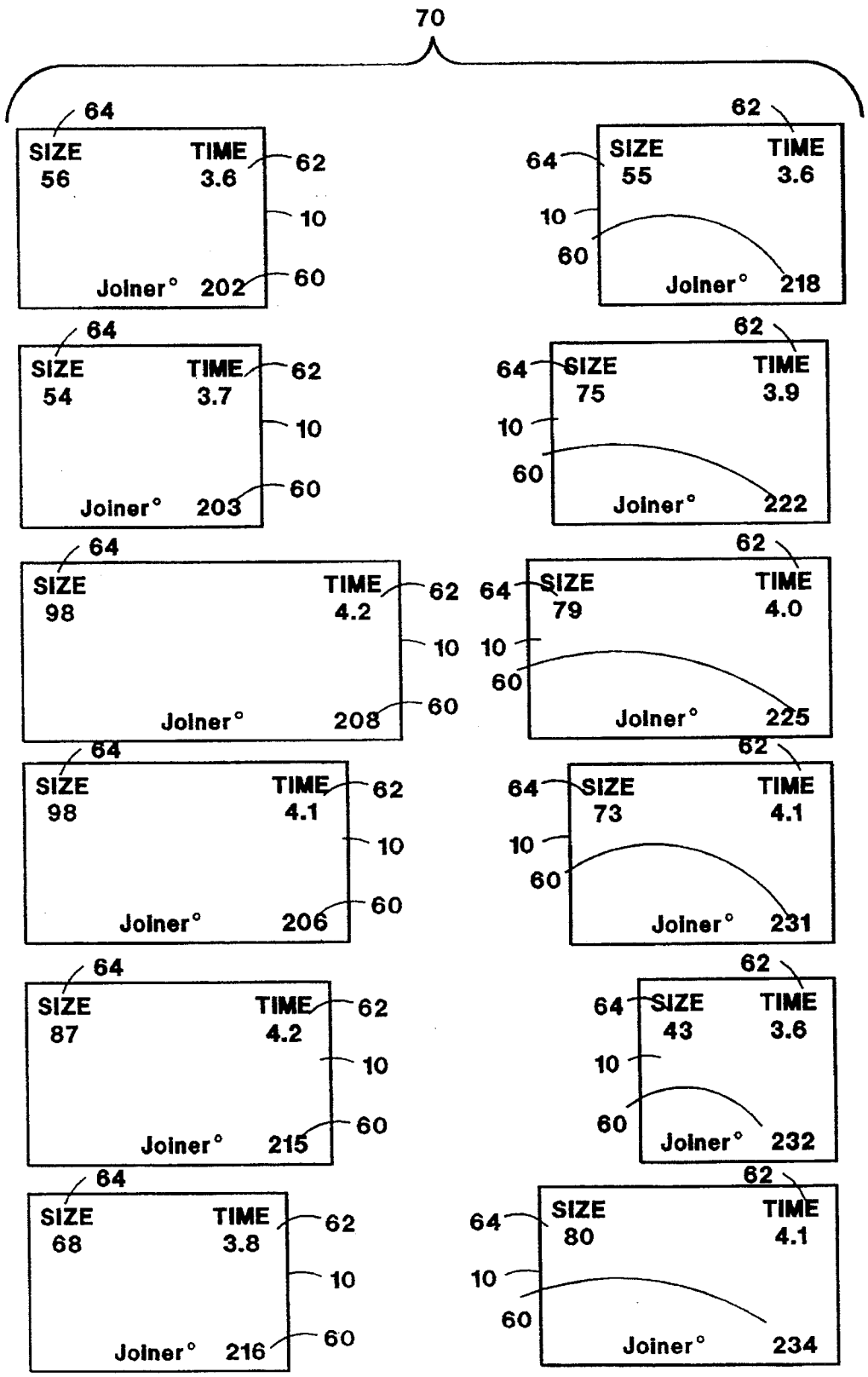
FIG. 11 is a top elevational view of a third group of planar tile members which are included in the second set of planar tile members in accordance with the instructional method and apparatus of the present invention.

A second set of tiles 58 is illustrated in FIGS. 9–11. FIGS. 9–11 illustrate a top elevational view of the three groups of tiles 10 contained within the second set of tiles 58. Each of the tiles 10 contained within the second set of tiles 58 includes a time sequence number 60, a production time number 62, and a size number 64. Furthermore, each of the tiles 10 contained within the second set 58 each comprises a stratification factor such as color.

Groups of tiles may be defined by their stratification factor. FIG. 9 shows a group of blue tiles 66, FIG. 10 shows a group of red tiles 68, and FIG. 11 shows a group of yellow tiles 70. Each group of tiles comprises a plurality of tiles wherein each tile contains a time sequence number 60, a production time number 62, and a size number 64. The length of each tile 10 equals its size number 64 in millimeters. The tiles 10 contained within the second set 58 range from 43 millimeters to 98 millimeters in length.

The numbers 60,62,64 contained within the second set of tiles 58 represent indicia 14. Furthermore, like the design indicia 14 contained within the first set of tiles 11, the number indicia 60,62,64 contained within the second set of tiles 58 are etched, cut, or stamped into the first upper planar surface 16 of the tiles 10. Alternatively, the number indicia 60,62,64 may be cut into both the first upper planar surface 16 and the second lower planar surface 18 of the tile 10 to form a hole through the tile 10 which is in the form of the number indicia 60,62,64.

FIG. 12 is an example of a third data collection chart 72 which is designed for use with the second set of tiles 58. All of the number indicia 60,62,64, including the time sequence number 60, the production time number 62, and the size number 64, as well as the stratification factor, namely color, may be charted on one form. The recorded data from the third data collection chart 72 may then be used to develop plots or diagrams to show data patterns.

Figure 13:
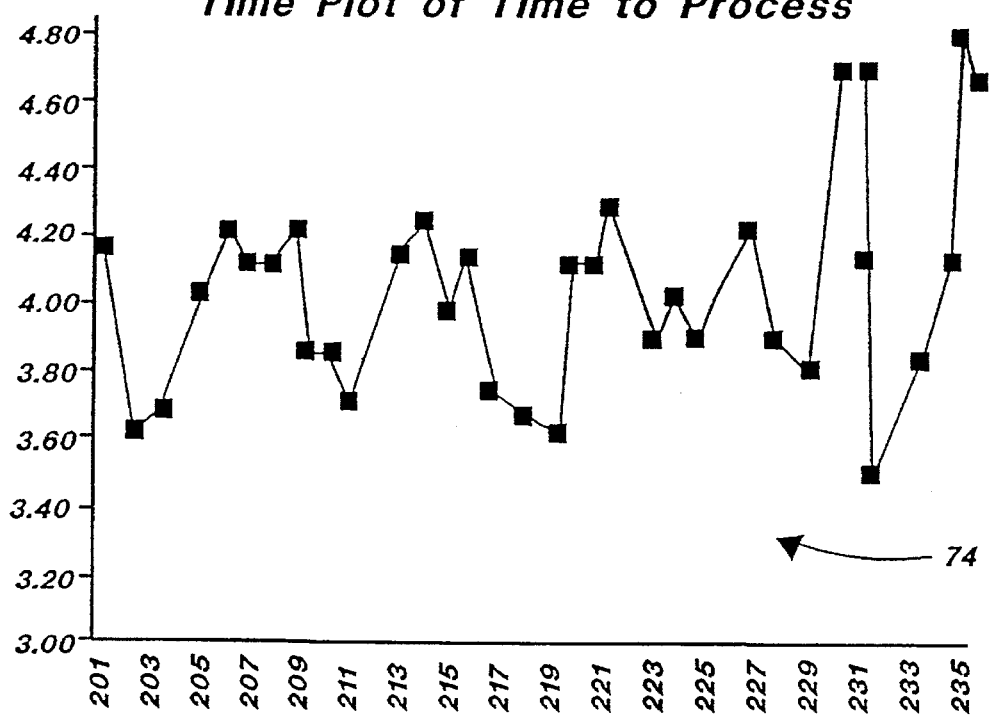
FIG. 13 is an example of a time plot which may be utilized in accordance with the instructional method and apparatus of the present invention along with sample plotted data.
Figure 14:
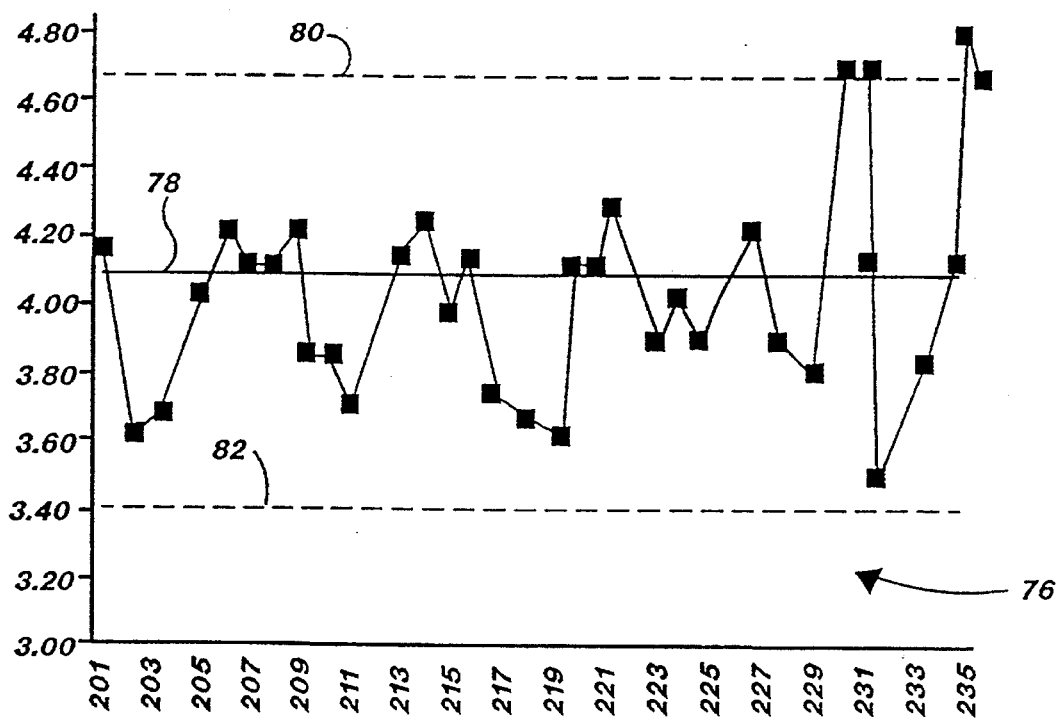
FIG. 14 is an example of an individuals chart which may be used in accordance with the instructional method and apparatus of the present invention along with sample plotted data.

A variety of plots and diagrams are shown in FIGS. 13–16. FIG. 13 illustrates a time plot which helps to identify changes in the data over time. FIG. 14 illustrates an individuals chart 76 which has lines showing the data average 78, the upper control limit 80 and the lower control limit 82.

Figure 15:
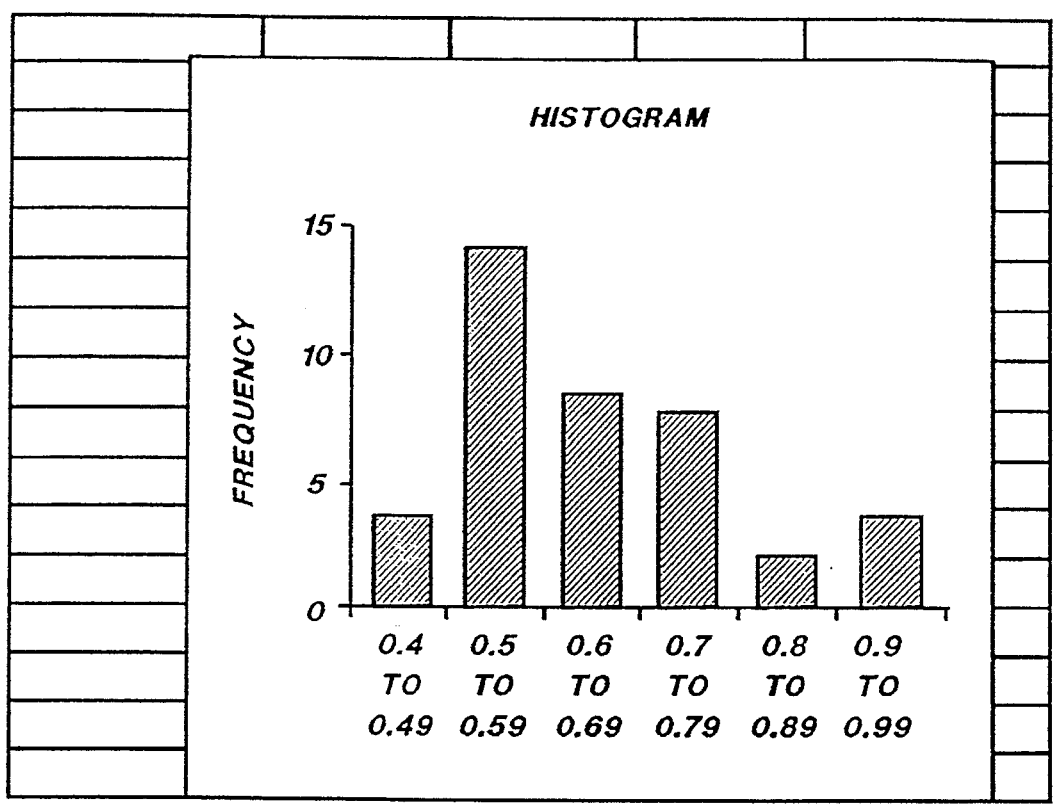
FIG. 15 is an example of a frequency plot which may be used in accordance with the instructional method and apparatus of the present invention along with sample plotted data.
Figure 16:
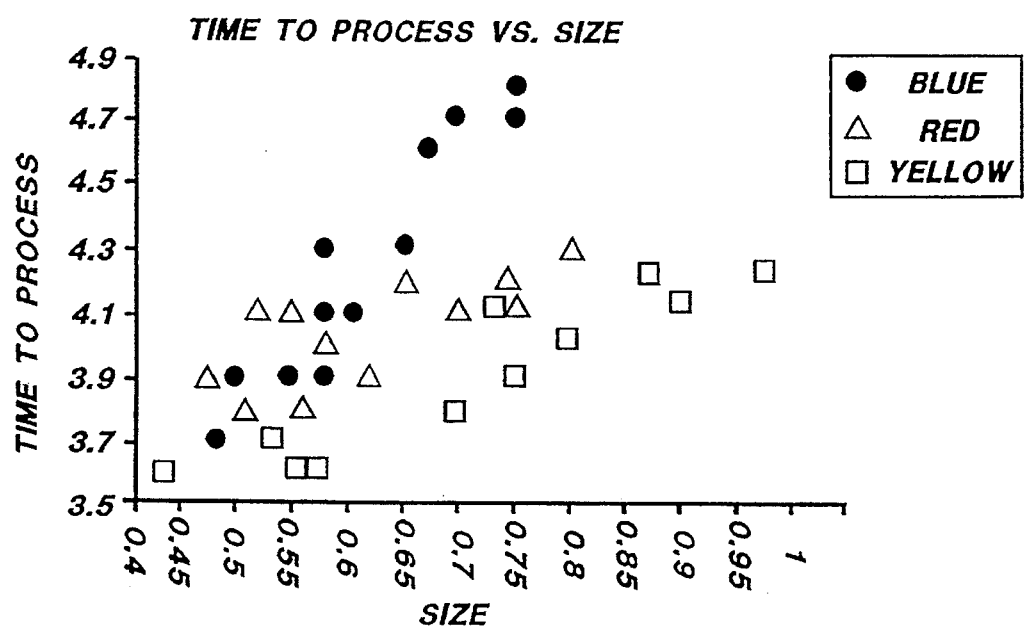
FIG. 16 is an example of a scatter diagram which may be used in accordance with the instructional method and apparatus of the present invention along with sample plotted data.

FIG. 15 illustrates a frequency plot 84 which helps to identify patterns in the data and show variations in the data. Finally, FIG. 16 illustrates a scatter plot 86 which indicates whether changes in one variable are associated with changes in another variable.

The instructional method and apparatus is particularly well suited for assisting a company or business in identifying, analyzing, and correcting specific defects or problems existing in a product or administrative process. The instructional method and apparatus may be utilized in both goods and services industries. For example, the indicia 14 contained in the tiles 10 may be characterized as defects in a company's product or process. This will help users of the method and apparatus visualize how the defects in their own workplaces and businesses should be identified, analyzed, and solved as they follow the instructional method using the sets of tiles 11,58.

Figure 17:
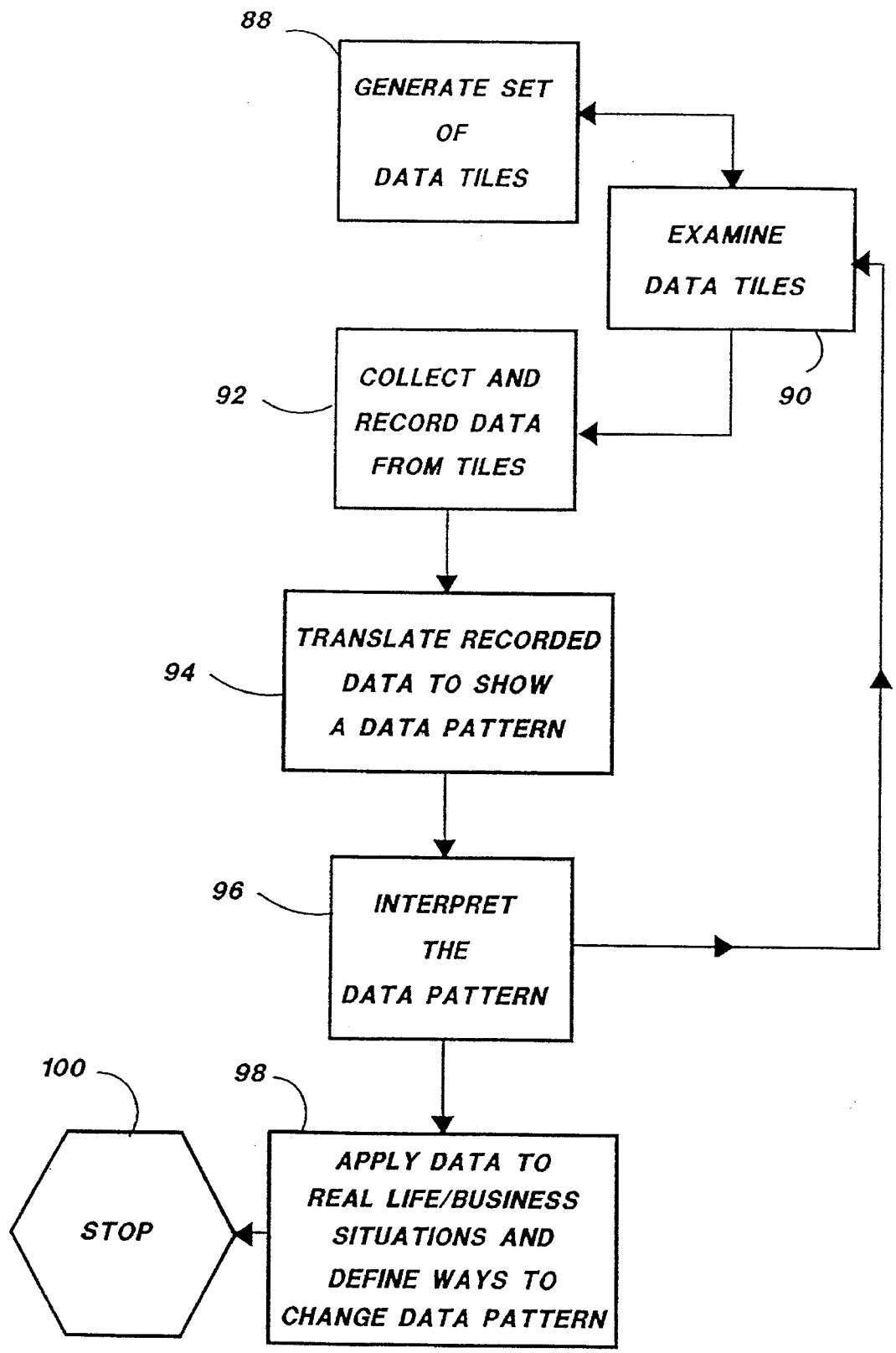
FIG. 17 is a flow chart which outlines the steps of the instructional method and apparatus of the present invention.

Turning now to FIG. 17, there is shown a flow chart which outlines the steps of the inventive instructional method. The first step 88 involves generating a set of data tiles by assigning data indicators to a plurality of tiles 10. The tiles 10 may be arranged in sets and may contain any number or type of collectable data. The second step 90 involves examining the data tiles 10. The data is then collected and recorded from the tiles in step three 92. The fourth step 94 involves translating the recorded data to show a data pattern.

After translating the data in step four 94, the data pattern is interpreted in step five 96. The user may then start the instructional method over by again examining the data tiles as performed in step two 90, or alternatively, the user may apply the data 10 to real life situations and define ways to change the data pattern in step six 98. In step six 98, the user is applying a thought process similar to that learned with the data tiles to their own situation. This usually occurs at a later time after using the data tiles. Here, users may identify defects or problems present in their own work environments. Once the regularity of the defects and the reasons for regularity have been identified, users can brainstorm to arrive at solutions for changing the regularity pattern, and thereby solve some of their work-related defects or problems. Finally, the user may conclude the instructional method by stopping at step seven 100.

The instructional method and apparatus of the present invention has been described above with reference to teaching data collection and data analysis using the technique of stratification (looking for special patterns in subsets of data) and by analyzing the data by itself, over time, and in relation to other data variables. Other orders of data analysis may also be taught by utilizing the present invention.

While preferred embodiments of the invention have been shown and described, it will be apparent to those skilled in this art that various modifications may be made in these embodiments without departing from the spirit of the present invention. Therefore, all suitable modifications and equivalents fall within the scope of the invention.

What is claimed is:

1. An instructional apparatus for teaching data collection and data analysis comprising:
   a. at least one set of planar tile members each comprising a defined shape and having a first upper planar surface and a second lower planar surface, wherein at least one of said planar tile members further comprises at least one indicia etched in at least one of said first and second surfaces of said planar tile member, the indicia representing data relating to characteristics of a problem; and
   b. means for collecting data related to said indicia from said at least one set of planar tile members; and
   c. means for analyzing the collected data, whereby the data may be collected and analyzed to facilitate the formation of solutions to the problem.

2. The apparatus of claim 1 wherein each of the tile members is transparent.

3. The apparatus of claim 1 wherein each of the tile members further comprises an orientation mark.

4. The apparatus of claim 3 wherein said orientation mark comprises at least one of a word or symbol placed at a predefined location on each of the planar tile members.

5. The instructional apparatus of claim 1 wherein said at least one set of planar tile members comprises:
   a. a first group of planar tile members wherein each of said planar tile members further comprises a first defined shape, a predetermined color, and at least one of the tile members in the first group of tile members further comprises a distinct design;
   b. a second group of planar tile members wherein each of said planar tile members further comprises a second defined shape, a predetermined color, and at least one of the tile members in the second group of tile members further comprises a distinct design; and
   c. a third group of planar tile members wherein each of said planar tile members further comprises a third defined shape, a predetermined color, and at least one of the tile members in the third group of tile members further comprises a distinct design.

6. The instructional apparatus of claim 1 wherein said at least one set of planar tile members comprises:
   a. a first group of planar tile members wherein each of said tile members further comprises a first predetermined color and at least one of the tile members in the first group of tile members further comprises a number;
   b. a second group of planar tile members wherein each of said tile members further comprises a second predetermined color and at least one of the tile members in the second group of tile members further comprises a number; and
   c. a third group of planar tile members wherein each of said tile members further comprises a third predetermined color and at least one of the tiles in the third group of tile members further comprises a number.

7. An instructional apparatus for teaching data collection and analysis comprising:
   a. a set of objects containing a predetermined number of subsets of objects, each subset of objects containing a predetermined number of objects, wherein each object within a subset has at least one of the following features in common between objects in the subset: a predetermined color, a predetermined shape, a predetermined size, and a predetermined type of indicia, and wherein the features represent characteristics of a problem; and
   b. means for collecting data relating to the features of the objects;
   c. means for analyzing data relating to the features of the objects, whereby the distribution of features between objects may be illustrated and analyzed to facilitate the formation of solutions to the problem.

8. The apparatus of claim 7 wherein the means for collecting data relating to the features of the objects consists of one of the following: a histogram, a Pareto chart, a control chart, a concentration chart, a scatter plot, a time plot, a frequency plot, and a table.

9. The apparatus of claim 7 wherein the set of objects includes at least one subset of objects having a common predetermined indicia and further having an orientation mark, and further wherein at least three objects within the subset have the common predetermined indicia at dissimilar locations on the objects.

10. The apparatus of claim 7 wherein the set of objects includes at least one subset of objects having a common predetermined indicia, a common shape, and an orientation mark, and further wherein at least three objects within the subset have the common predetermined indicia at dissimilar locations on the objects.

11. The apparatus of claim 7 wherein the set of objects includes at least two subsets of objects having different predetermined colors.

12. The apparatus of claim 7 wherein the set of objects includes at least two subsets of objects having different predetermined shapes.

13. The apparatus of claim 7 wherein the set of objects includes at least two subsets of objects having different predetermined indicia.

14. The instructional apparatus of claim 7 wherein each subset having a common type of indicia between tile members includes an orientation mark and at least two tile members wherein the indicia are located at different distances from the edges of the object.

15. The instructional apparatus of claim 7 wherein each subset having a common type of indicia between tile members includes an orientation mark and at least three tile members wherein the indicia are located at different distances from the edges of the object.

16. The instructional apparatus of claim 7 wherein the set of objects includes objects having a common predetermined shape, but different sizes.

17. An instructional apparatus for teaching data collection and analysis comprising:
   a. a plurality of tile members, each tile member including a top face having a predetermined shape, a bottom face, and at least one edge bounding the top face and bottom face, the plurality of tile members including tile members having a predetermined number of different colors, a predetermined number of different shapes, and a predetermined number of different types of indicia located upon the top face, wherein the different colors, the different shapes, and the different types of indicia comprise data relating to the characteristics of a problem;
   b. means for collecting and tabulating data relating to at least one of the color, shape, and type of indicia; and
   c. means for graphically illustrating and analyzing data relating to at least one of the color, shape, and type of indicia, whereby the distribution of colors, shapes, and types of indicia between tile members may be illustrated and analyzed to facilitate the formation of solutions to the problem.

18. The apparatus of claim 17 wherein at least two tile members within the plurality of tile members have the same color.

19. The apparatus of claim 17 wherein at least two tile members within the plurality of tile members have the same shape.

20. The apparatus of claim 17 wherein at least two tile members within the plurality of tile members have the same type of indicia.

21. The apparatus of claim 20 wherein the tile members include an orientation mark on their top faces, and wherein the tile members which have the same type of indicia located upon the top face include tile members wherein the same indicia are distributed at varying distances from the orientation mark.

22. The apparatus of claim 17 wherein the means for graphically illustrating and analyzing data consists of one of the following: a Pareto chart, a histogram, a concentration chart, a control chart, a scatter plot, a frequency plot, a time plot, and a table.

23. An instructional apparatus for teaching data collection and analysis comprising:
   a. a plurality of tile members, the plurality of tile members having subsets of the members wherein each subset includes tile members having at least one of the following features in common: a color, a shape, a size, and a type of indicia located upon the tile members; and
   b. means for analyzing data relating to the features, wherein statistical relationships between data are illustrated in graphic form to facilitate analysis of the data.

24. The instructional apparatus of claim 23 further comprising means for collecting data relating to the features, wherein statistical relationships between data are illustrated in tabular form.

25. The instructional apparatus of claim 23 wherein the plurality of tile members includes tile members having a common shape, but different sizes.

26. The instructional apparatus of claim 23 further comprising instructions for use.

27. A process for teaching data collection and analysis comprising:
   a. providing a plurality of tiles, the plurality of tiles having subsets of tiles wherein each subset includes tiles having at least one of the following features in common: a color, a shape, a size, and a type of indicia located upon the tiles, and wherein at least one of the features represents data relating to the characteristics of a problem; and
   b. providing means for collecting data relating to the features, wherein relationships between dam are illustrated in tabular form;
   c. providing means for analyzing data relating to the features, wherein relationships between data are illustrated in graphic form;
   d. selecting a number of tiles from the plurality of tiles;
   e. collecting data from the tiles relating to the features and recording it on the means for collecting data; and
   f. translating the collected and recorded data to the means for analyzing data.

* * * * *